United States Patent
Dyrdal et al.

(10) Patent No.: US 11,906,061 B2
(45) Date of Patent: Feb. 20, 2024

(54) IN-LINE TESTING OF PRESSURE SAFETY VALVES

(71) Applicant: Ideation AS, Høvik (NO)

(72) Inventors: Knut Are Dyrdal, Bekkjarvik (NO); Arne Ole Roald, Jar (NO)

(73) Assignee: Ideation AS, Havik (NO)

( * ) Notice: Subject to any disclaimer, the term of this patent is extended or adjusted under 35 U.S.C. 154(b) by 477 days.

(21) Appl. No.: 17/275,561

(22) PCT Filed: Sep. 11, 2019

(86) PCT No.: PCT/NO2019/050184
§ 371 (c)(1),
(2) Date: Mar. 11, 2021

(87) PCT Pub. No.: WO2020/055267
PCT Pub. Date: Mar. 19, 2020

(65) Prior Publication Data
US 2022/0112961 A1    Apr. 14, 2022

(30) Foreign Application Priority Data
Sep. 11, 2018  (NO) .................................. 20181183

(51) Int. Cl.
*G01M 3/24* (2006.01)
*F16K 17/04* (2006.01)
(Continued)

(52) U.S. Cl.
CPC ........ *F16K 17/0413* (2013.01); *F16K 37/005* (2013.01); *F16K 37/0083* (2013.01);
(Continued)

(58) Field of Classification Search
CPC .............. F16K 37/0091; F16K 37/005; F16K 17/0413; F16K 37/0083; G01M 3/24
See application file for complete search history.

(56) References Cited

U.S. PATENT DOCUMENTS

| | | | |
|---|---|---|---|
| 2010/0018284 A1* | 1/2010 | Varga | F16K 17/04 73/1.72 |
| 2019/0294183 A1* | 9/2019 | Al Khunaizi | F17D 5/00 |
| 2019/0294184 A1* | 9/2019 | Al Khunaizi | G05D 16/204 |

FOREIGN PATENT DOCUMENTS

| | | |
|---|---|---|
| CN | 103 913 306 | 7/2014 |
| EP | 1 859 184 | 11/2007 |

(Continued)

OTHER PUBLICATIONS

International Searching Authority, "International Search Report and Written Opinion," issued in connection with PCT Patent Application No. PCT/NO2019/050184, dated Nov. 29, 2019, 16 pages.

(Continued)

*Primary Examiner* — Jamel E Williams
(74) *Attorney, Agent, or Firm* — Hanley, Flight & Zimmerman, LLC

(57) ABSTRACT

It is described an in-line safe pressure test system and method for detecting leaks in a pressure safety valve PSV (100), the valve including an inlet (P1), outlet (P2) and valve seat controlling fluid flow between said inlet and outlet. The system includes a Safety Controller SC (110) with a test fluid source, at least one Abnormal Condition Detector ACD unit, controller, data storage unit, and communication means for sending and receiving signals from/to the SC and an external safety system, wherein the SC is adapted to apply a test pressure to the inlet side of the PSV until the test pressure exceeds a set opening pressure of the PSV and the valve seat starts lifting, detect the sound caused by vibrations from the first small leak past the valve seat, record and store the value of said test pressure and/or report said test pressure via said communication means.

12 Claims, 5 Drawing Sheets

A safety valve solution consisting of two safety valve systems.

(51) Int. Cl.
*F16K 37/00* (2006.01)
*G01M 3/28* (2006.01)

(52) U.S. Cl.
CPC ........... *F16K 37/0091* (2013.01); *G01M 3/24* (2013.01); *G01M 3/2876* (2013.01)

(56) References Cited

FOREIGN PATENT DOCUMENTS

| EP | 1859184 A1 | * | 11/2007 | ............. F16K 17/04 |
| GB | 2 539 498 | | 12/2016 | |
| WO | 2006092548 | | 9/2006 | |
| WO | WO-2006092548 A1 | * | 9/2006 | ............. F16K 17/04 |

OTHER PUBLICATIONS

International Preliminary Examining Authority, "Written Opinion," issued in connection with PCT Patent Application No. PCT/NO2019/050184, dated Oct. 16, 2020, 9 pages.
International Preliminary Examining Authority "International Preliminary Report on Patentability," issued in connection with PCT Patent Application No. PCT/NO2019/050184, dated Jan. 20, 2021, 13 pages.
Norwegian Patent Office, "Search Report," issued in connection with Norwegian Application No. 20181183, dated Apr. 24, 2019, 2 pages.

* cited by examiner

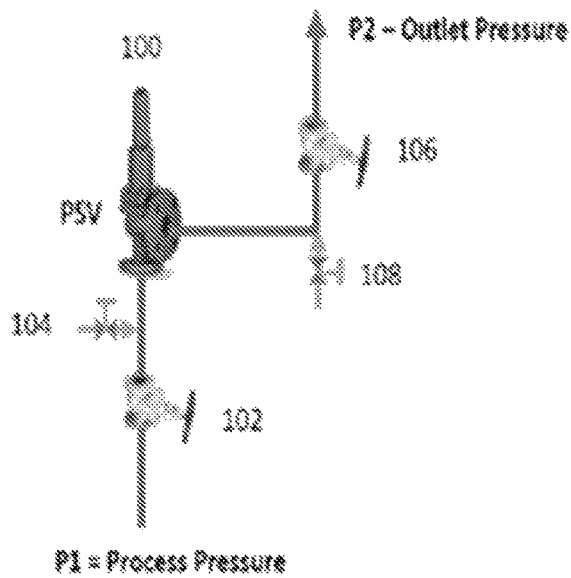
Figure 1: A Safety Valve System with Isolation Valves and Bleed/Connection Valves.
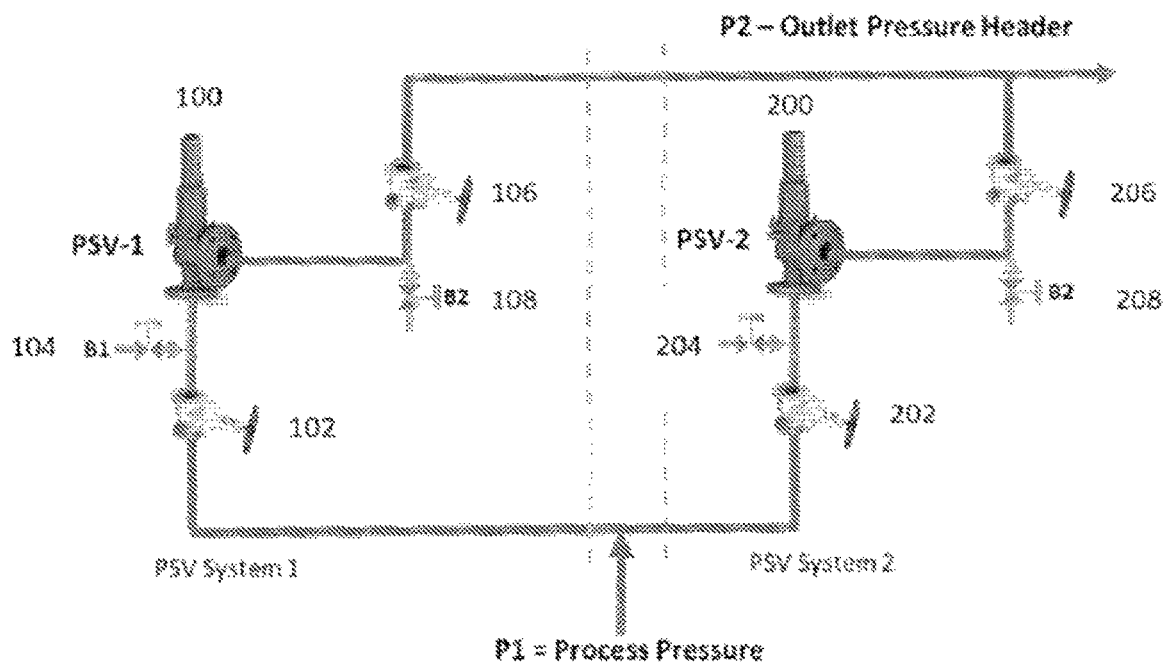
Figure 2: A safety valve solution consisting of two safety valve systems.

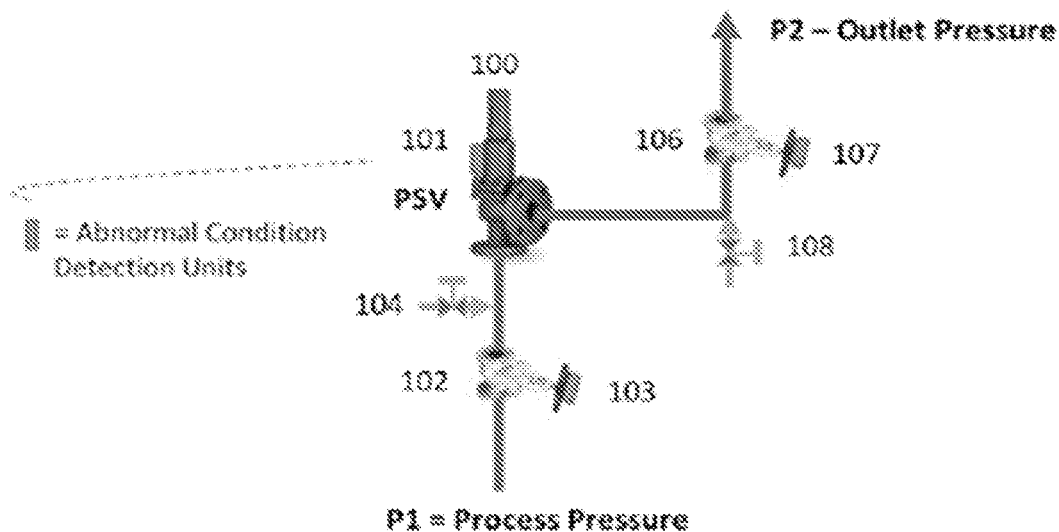
Figure 3: PSV with ACD (Abnormal Condition Detection) units as well as ACD units on the isolation Valves.
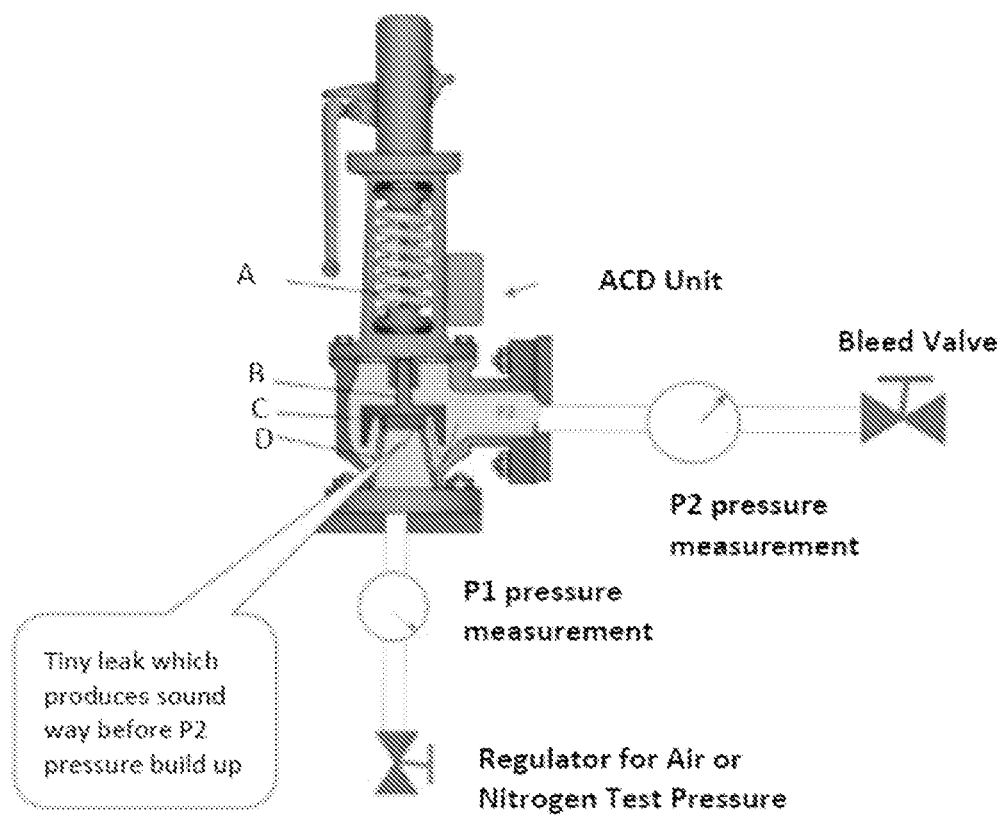
Figure 4: Check of opening pressure and leak rate using an ACD unit.

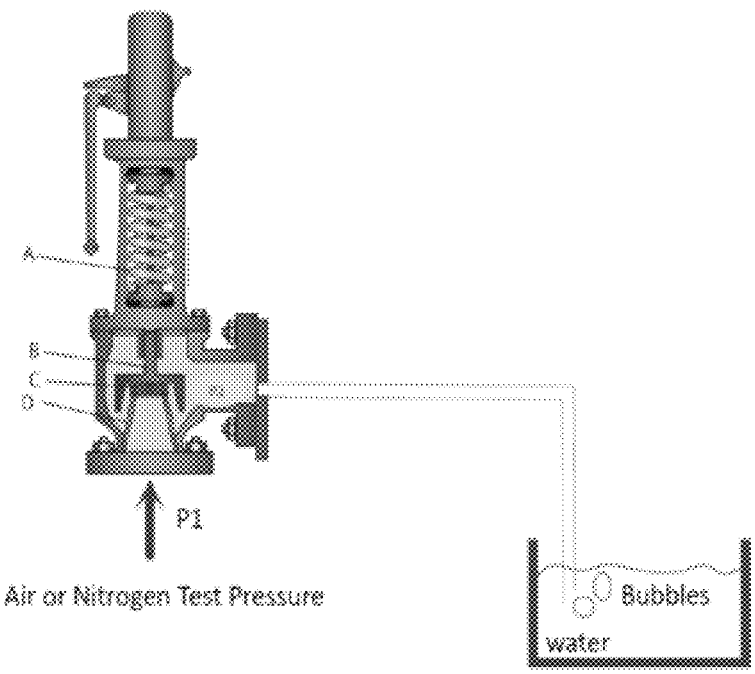
Figure 5: Current art for detection of tight PSV or leakage within acceptable limits.
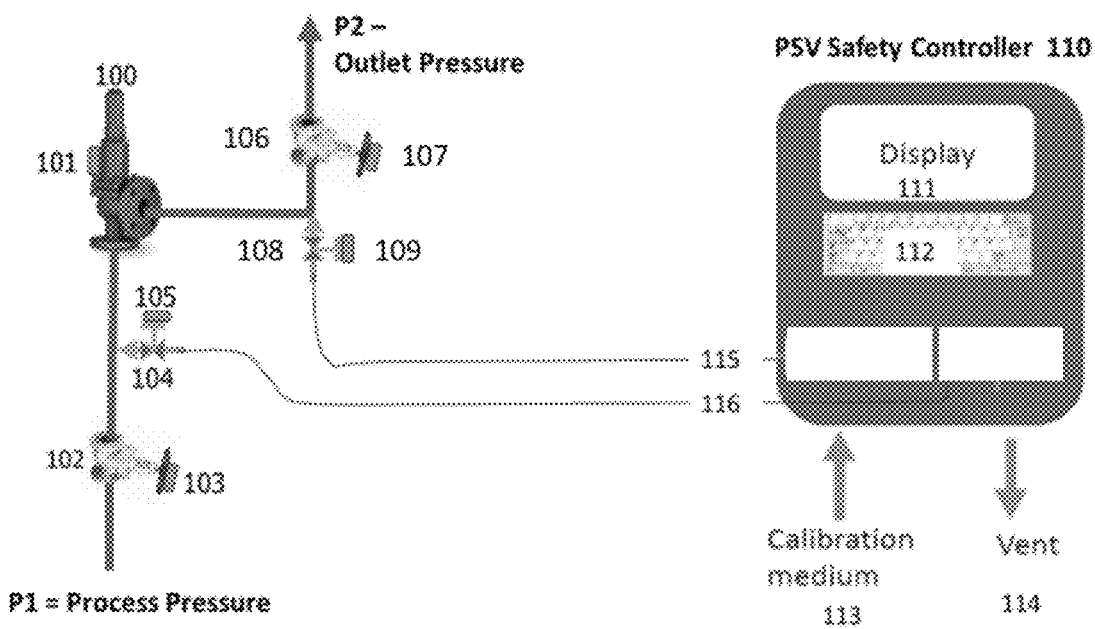
Figure 6: The TC Controller Connected for testing.

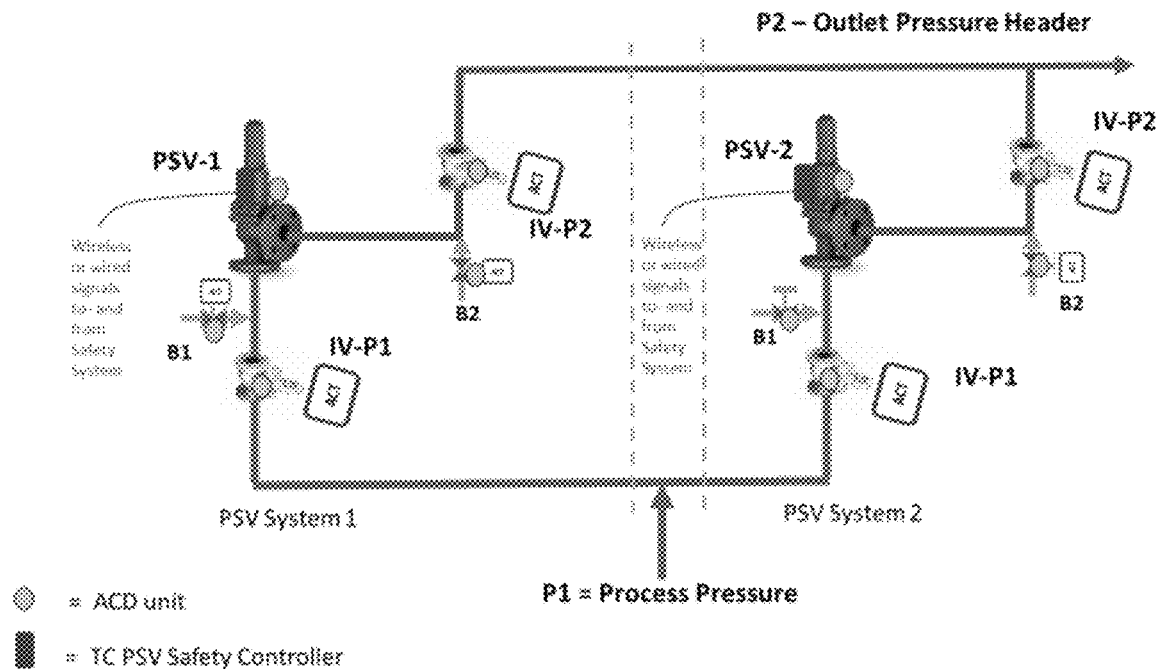
Figure 7: High Safety PSV solutions and PSV solutions for remote operations.
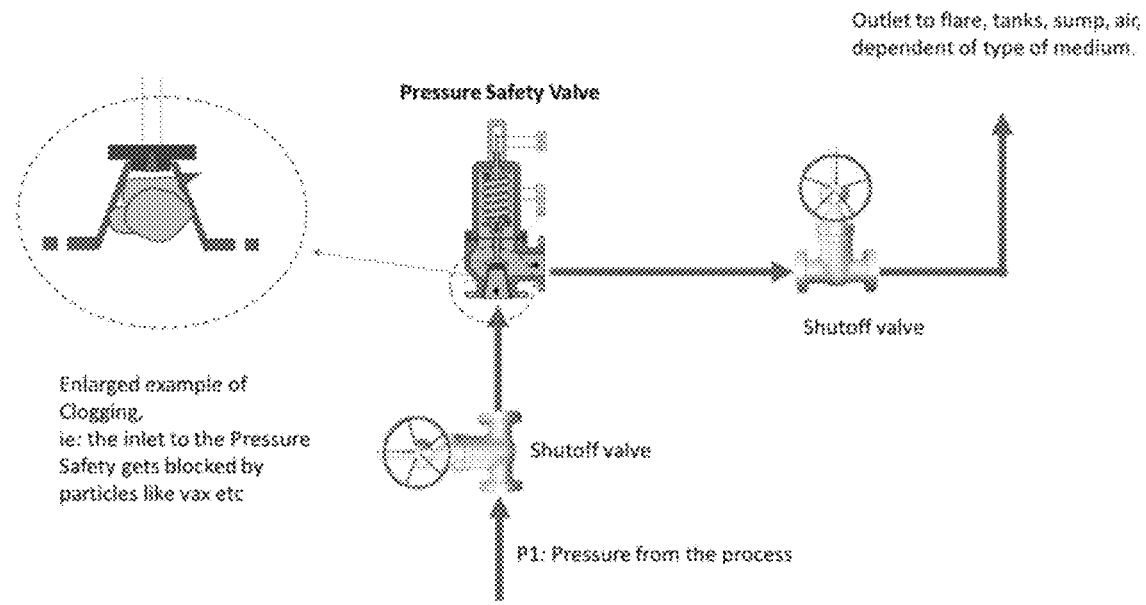
Figure 8: Clogging of Pressure Safety Valves.

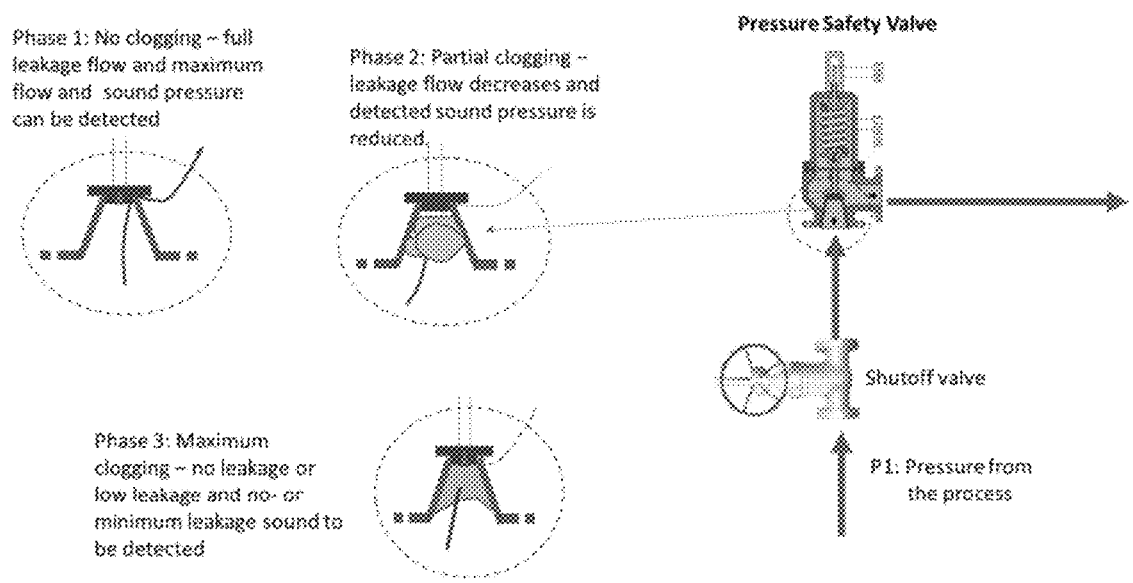
Figure 9: Clogging, leakage flow and sound detection over time.

IN-LINE TESTING OF PRESSURE SAFETY VALVES

CROSS-REFERENCE TO RELATED APPLICATIONS

This patent is a US national stage application of International Patent Application No. PCT/NO2019/050184 which was filed on Sep. 11, 2019, under the Patent Cooperation Treaty (PCT), which claims priority to Norwegian Patent Application No. 20181183 which was filed on Sep. 11, 2018, all of the foregoing applications are hereby incorporated herein by reference in their entireties.

FIELD OF THE INVENTION

The present invention relates to a system for safe testing and calibrating and certifying the calibration of Safety Relief Valves (SRV) and Pressure Safety Valves (PSV), without removing them from the process pipeline.

BACKGROUND

A Pressure Safety Valve (PSV) is used to protect a process system against overpressure. The two most common safety valves are the Safety Relief valve (SRV) and the Pressure Safety Valve (PSV) in addition there exists a third type, named a Pilot Operated Safety Valve. The SRV will open when the process pressure is above the pre-set (calibrated) opening pressure to let out overpressure, then return to the closed position when the pressure gets below the pre-set pressure. This is called a modulating opening.

A typical PSV is a direct spring-loaded safety valve characterized by rapid opening a so-called pop action, when subjected to an upstream pressure above the PSV pre-set pressure. The pre-set pressure is also called the set pressure. The PSV will close when the upstream (inlet) pressure falls below the pre-set pressure. PSVs are used in a variety of industrial applications to safeguard process equipment for exposure of internal pressures exceeding the equipment design pressure. One industrial application where PSVs are used is within the oil and gas industry. Each plant may have from hundreds to thousands of installed PSVs. Consequences of a fault on any one PSV ranges from hazardous explosions and fire to releases of hydro carbon and other toxic gases to environment.

All the above-mentioned types of valves will herby be referred to as PSVs to simplify the description of the invention and since the system and method primarily concern use in systems where PSV valves are mainly used.

PSVs are normally maintained on predefined intervals in the class of preventive maintenance. The maintenance intervals range from 1 year to 6 years typically with an average of 2 years in the oil and gas industry and sometimes longer in applications in other industries. This time is normally set by the test standard the company choose to implement as well as the risk assessment for the processes the PSVs are protecting. Experience from the Norwegian oil industry (petroleum safety authority) is showing that faults recorded during maintenance of PSVs are typically 2%-3% of tested units in the period 2005 to 2015. Reducing the maintenance time and costs associated with maintaining PSVs can have a large impact on the plant total maintenance cost.

This invention hence focus on how the safety valves can be checked in-line without the costly removal, allowing only the 2%-3% which really have faults, to be shut down and taken out of the pipeline for maintenance and/or repair. By doing so, the maximum time for a take-out-safety-check can, depending of criticality and the testing standard used be extended to 6 years or more. Depending on the safety standards used by the company.

SUMMARY

The main objective of the invention is to provide a system and method to check that a Pressure Safety Valve (PSV) will open at a pre-set pressure as well as knowing that the valve has no clogging which will prevent flow when the valve opens, this without removing the valve from the pipeline.

Another object is to certify that the said PSV is tightly closed or has a leakage which is below a maximum allowable leak rate. The valve is then safe and ready for operation or it may have to be certified for that. A typical Pressure Safety Valve System consisting of a safety valve and isolation valves as well as connection valves/bleed valves for letting out overpressure, measuring pressure or inserting pressure for calibration.

It is also an object of the invention to provide a method and system to reduce maintenance work of the PSV by having a ACD unit (Abnormal Condition Detection Unit) mounted on the PSV which are taken into workshops for bench-testing and use this faster methods than prior art as for detecting and verifying the integrity of the calibration of the PSV being maintained and calibrated.

It is also an object of the invention to provide a method and system to check that the isolation valves which normally are in front and after the PSV valves, and with the PSV valves forms a PSV System are operational, not clogged, i.e. blocks flow and are not leaking. Two or more PSV systems create a total PSV Solution.

It is further an objective of the invention to provide a method and system to ensure that all isolation valves are in safe operating positions and are operated in a safe sequence to prevent accidents to happen and to ensure that the automatic- or manual movement of these valves are recorded for safety documentation.

It is further an object of the invention to provide a method and a system to ensure that any unauthorized change of the Isolation Valves is monitored and creates alarm(s).

It is further an objective of the invention to provide a method and system which replaces the traditional and complex locking systems for the isolation valves.

It is furthermore an object of the invention to provide a system and method to make it possible to remotely initiate the checking of the safety valves remotely when the PSV Solutions have redundant systems. This allowing one of the two systems in a Solution to safeguard the process while the other system is being checked or maintained.

These objects are achieved in a system and method according to the appended claims.

BRIEF DESCRIPTION OF THE DRAWINGS

The invention will now be described in more detail with reference to the appended in which:

FIG. 1, showing a Safety Valve System with Isolation Valves and Bleed/Connection Valves.

FIG. 2, showing a Safety Valve solution consisting of two safety valve systems.

FIG. 3, showing a PSV with ACD (Abnormal Condition Detection) units as well as ACD units on the Isolation Valves.

FIG. 4, showing the check of opening pressure and leak rate by the use of an ACD unit.

FIG. 5, showing the Current art for detection of tight PSV or leakage within acceptable limits.

FIG. 6, showing the SC Controller Connected for testing.

FIG. 7, showing the High Safety PSV solutions and PSV solutions for remote operations FIG. 8, showing the clogging of Pressure Safety Valves.

FIG. 9, showing clogging, leakage flow and sound detection over time.

DETAILED DESCRIPTION OF THE INVENTION

At least one embodiment of the present invention is described below in reference to the operation of in-line testing of a Pressure Safety Valve (PSV) 100, 200, within an oil and gas production or treatment plant. However, it should be apparent to those skilled in the art and guided by the teaching herein, that the present invention is likewise applicable to any industrial facility that may be using PSVs. A non-exhaustive listing of possible industrial facilities that employ PSVs and have a need to monitor such valves includes power generation plants, chemical facilities and electrical facilities. Those skilled in the art will further recognize that the teaching herein are suited to other applications in addition to industrial settings such as for example military, commercial and residential applications.

The invention will be described below with reference to FIG. 1 consisting of a PSV system. The PSV system is arranged with a PSV 100, where a first Isolation valve/IV-P1 (?) is connected to PSVs 100 inlet side (P1), and a second Isolation Valve/IV-P2 (?) is connected to the same PSVs 100 outlet side, P2. Both these said Isolation Valves functionality in the system is to close the respective inlet and outlet side for flow into and out-off of the said PSV 100. Between the said PSV 100 and the mentioned Isolation Valves there are two Bleed Valves/B1, B2 104,108, where a first bleed valve 104 is placed one on the inlet side, and a second bleed valve 108 is placed one the outlet side. Where the functionality of the said Bleed Valves is to flow the test-fluid or gas through into the connected PSV 100 respectively inlet side or outlet side and to ventilate out pressure as described later in the test process method.

Two or more PSV systems connected is a total PSV solution as shown in FIG. 2, where the system can be closed off for testing or calibration and maintenance, while the other(s) has enough capacity to bleed off the process over-pressure to the outlet.

The invention uses a pressure measurement of the applied P1 pressure, and the pickup of sound caused by vibrations by the first small leak past the seat. This sound comes from the first almost invisible opening of the valve once the test pressure on the P1 side exceeds the spring pressure and the seat lifts and creates its first small opening. This is shown in FIG. 4, arranged with a PSV, arranged with Bleed Valves on both inlet side and outlet side and in between the Bleed Valves and the PSV, is two measurement apparatus, one on the inlet side and one on the outlet side. This method is considerably faster than current method used, shown in FIG. 5, in where one is waiting for a pressure to build up on the P2 side of the PSV and then wait for bubbles to occur in the bubble counting vessel on the said outlet (P2) side of the valve. It will be obvious for the skilled reader that the method described in FIG. 4 can be executed without removing the valve from the pipeline and without adding a counting system for bubbles. The prior art is a manual counting of the bubbles for a given time period, then indicate that the valve is tight, or the leakage is within acceptable limit as shown in FIG. 5.

This method to use tiny seat lifting and the consequent sound instead of waiting for a build-up of pressure on the P2 (outlet side) of the valve which needs to fill the big P2 cavity, including the PSV outlet of the valve and all valve outlet pipeline cavity, is much faster than mentioned bubble counting method normally used.

This because sound from the first small leak will be picked up by the ACD (Abnormal Condition Detection) listening device as soon as the seat which is connected to the spring, starts lifting and let calibration medium, normally nitrogen through. From that point on it takes longer time in prior art solutions to establish enough pressure in the P2 side cavity of the PSV 100 and the connected pipe. In addition, the sound will come before the leak and consequent small flow has enough volume and force to create an extra lift from the increased seat area in the P2 side of the PSV. When the seat lifts, the area of the seat will increase due to the construction of the valve. This allow test and calibration to take place without de-connecting the extra lift function from the additional seat area. This de-connecting of the additional seat area which gives the extra pressure area is done manually by removing a plug in the side of the PSV body and then adjusting what is called the Blow-Down ring which increases or decreases the lifting capacity of the additional seat area. The lifting capacity is reduced for testing to prevent a rapid opening (popping) to occur. This because a POP often damage the metal seats which normally are used in PSVs. This adjustment will not be needed with the low leak, sound-based detection of the opening. This saves a lot of time.

The other advantage over prior art is that the historic and previous test pressure, the so-called pre-set trip point, as well as allowed leak from last test, are stored in the Safety Controller (SC) unit 110 shown in FIG. 6, arranged with thereby allowing identification of whether the valve acceptable leakage has increased or decreased.

This gives an indication of the technical working condition of the valve and whether any small leakage have increased or decreased. The different test standards, like American Petroleum Institute standards, all allow some small amount of leakage and still accept the valve as functional acceptable.

The SC unit 110 shown in FIG. 6 may be brought to the valve being tested in the field, or the individual valve may have a SC unit and Calibration Medium permanently connected to the valve.

The other part of the invention is the unique test method where the SC unit 110 shown in FIG. 6 have an automation program of how fast the calibration pressure shall build up on the P1 inlet side for the identified valve to be tested. This step-wise increase of test pressure can then be fully automated, or it can be a digital indication to the person who run the test or calibration on how he or she shall increase the pressure by manual adjustment. The relevant pressure on the P1 side as well as the P2 side is always indicated to the test- or calibration operator, as well as recorded in the SC unit 110.

The test unit can be connected by fast couplings to the bleed/connection valves and the test controlled manually or automatically by the computer program inside the SC unit 110. The bleed/connection valves may be permanently- or temporarily during the calibration process, be equipped with their own ACD unit's 105, 109 which indicate opening, leak and/or flow rate.

Both the automated test-process controlled by the test unit, and the supervised manual process will run the test rather fast, thus saving time over normally used in-line testing methods as mentioned. Of interest is the fact that the early detection of the seat-lift without pressure build-up on the P2 side, allow test without having to disconnect the increased seat area function to prevent full popping under test which is the case of most prior art methods. This because the opening is detected so early and the leak through the first seat is so small that it does not allow enough flow or force to establish enough lift in the additional seat area to make a pop.

This particularly time saving is of interest when the tests or calibrations are executed by maintenance teams which come to a site to do work within a limited timeframe. This also saves times for calibration in works-shops once the said ACD units from the field is kept mounted on the valve as it transported to the workshop. For PSV, test or calibration in test and calibration benches, the invention allows more competitive testing and calibration in less time than using prior art.

Another advantage over prior art is that the test- and calibration process and its instrumentation can be used to verify the integrity of the complete safety loop (see FIG. 5, i.e. all PSV isolation valves which need to be open or closed will be verified to be in a safe position and the isolation valves does not leak. For test or removal of the PSV from the pipeline, these said valves must be closed to make it safe to open bleed valves or disconnect the flanges of the valves. To identify the closure of the isolation valves, or whether they are open when they must be open then they can be equipped with an ACD unit which tells the position of the valve, and whether a closed one has leaks, and whether the leaks are within acceptable level. The ACD unit communicates with the SC unit 110, which check that these valves are closed and do not leak by monitoring the position signals and the potential leak signals from the ACD unit. The SC unit 110 will also monitor that the ACD units 101 of the PSV System indicates that these Isolation Valves 102, 106 are in open position to allow the relevant PSVs to operate while the one where the SC unit 110 is active for calibration is out of function.

The same goes for the bleed valves 105, 107—they are equipped with ACD which tells whether they are open or closed, or whether they leak when they are closed.

The integrity or the condition of the Isolation valves can be verified in two different ways:
a) via an Abnormal Condition Detection (ACD) unit which is connected on the valves and listen for leak sounds,
b) using a 2-step process as follows:

Step 1—The test pressure on the inlet side P1 of the Pressure Safety Valve (PSV) is held pressure stable just below the pressure where it lifts the seat of the PSV. The leak from the previous test of said PSV which is recorded and stored in the SC unit 110 gets compared to the current leak to identify any increase of the leak. With closed Isolation Valves IV-P1 102 and IV-P2 106, a closed Bleed Valve 108 on the outlet side P2 of the PSV, and Bleed Valve 104 on the P1 side used for injection test pressure, the Safety Unit (SC) 110 increase the test pressure to a level just below the identified lifting pressure of the safety valve. The SC unit which also measures flow of calibration medium like nitrogen or any other medium, then measures how much calibration medium is needed to be applied to keep the pressure in the cavity between said Isolation Valve IV-P1 and the said Isolation Valve IV-P2 stable. If this volume is larger than the previous leakage from last calibration, and the sound indication through the Safety unit is the same, the P1 side Isolation Valve will have an increased leakage.

Step 2—In a second round of testing of the safety system integrity test, the SC 110 will apply the same—or another test pressure through the P2 bleed valve 108 and with a closed P1 Bleed Valve 104. Then closing the P2 Bleed Valve and monitor this pressure. We will then know that both Isolation Valves are tight enough—or whether they need to be taken out of the pipe-line for maintenance.

Following the step 1 and step 2 the SC 110 automatically, or with guiding for a manual process will run the test process to test the safety valve itself once the start testing start signal has arrived from a local- or remote operator, or from a safety system that checks all relevant process measurements like from the control system or from separate sensors, and one or more system gives the same signal to start. Using one or two, or more safety checking programs in parallel will prevent actions less both systems have same trigger signal or a single 2 out of 3 safety voting signal comes out of the safety system. This configuration is dependant of customers safety philosophy. It is the tests start signal which comes out of the safety programs which is relevant for this invention.

When the tester or the operator who shall perform the test, repair or removing the valve, or other equipment will according to this invention;
a) First check on his or her electronic display, normally a PAD, that all equipment to be included in the test is in the right working position or situation to ensure that the he or she has a safe working condition.
b) The signals for correct said position of valves may also be shown on a screen on the SC unit 110 which will have a company defined safety colour as background like yellow or green if all the equipment around are in the right working condition. The safety calculation come from comparing the working position and condition of the equipment and that valves which should in a safe working position are in said safe position and are compared to an electronic safety matrix which indicate what it is the safe position. The indication come from electronic comparisons in the operator's electronic unit, in the SC unit 110 or in a remote system which is in communication with the operator's unit—or it may be a combination of two or three of these showing the same results before a safe signal telling to proceed is shown on one of these units. All these signals may in the external safety program come from a matrix which contain safety signals from other devices like key-locks of electrical switches, from car-seal electronic key-locks on valves or from valve locking systems or other items being locked to prevent unintended operation while operators are executing a safety defined task. Only once the situation is calculated to be safe—or the operator has got an Override Warning Signal (OWS) from superiors or the safety system will allow the work, in this case the test of Safety Valves to start the operator is ready to run the test according a so-called Safe Pressure Testing.

Establishing the safe in-line Pressure Testing Process for a Valve System, is done according to the following steps 1 to 7.

Step 1—In order to safely test that the PSV 100, the Isolation Valves 102, 106 will be closed manually in order to prevent overpressure from the P1 Process which the PSV shall protect against. To protect from header pressure from the P2 outlet pressure which may come from other safety valves which goes to the same P2 outlet header, the isolation valve 106 will be closed. The said two isolation valves are closed, the Bleed valves 104, 108 will be opened to let out any overpressure from the inlet or the outlet of the PSV 100.

Step 2—If the pressure from the P1 Bleed Valve 104 continues to increase, and identified by manual flow detection, and after the above #1 point, the Isolation Valve 102 is leaking, and the test must be abandoned until the total pressure is down or the Isolation Valve 102 has been fixed.

Step 3—Assuming a tight closed valve or any leak in the Isolation Valve 102 has been fixed, The PSV Safety Controller 110 will be connected to its low-pressure side 115 to the Bleed Valve 108 and the Calibration Medium side 113 to the Bleed valve 104

Step 4—The PSV safety controller will also be connected to the ACD units 101. 103, 105, 107, 109 on their respective valves through wires and a plug, or wirelessly to each of the said ACD units. Said controller may be configured so it will not start functioning until it has an acceptance signal from the process operator in a control room or to a safety system which controls the test process. The PSV Safety Controller 110 gets its input of Calibration Medium, normally Nitrogen, Air, Water, Steam or Gas through its Calibration Medium 113 input. Overpressure from the testing will be vented out through the Safety Controller's ventilation side 114 to air or to a suitable collection vessel or pipe for said calibration medium.

Step 5—The calibration medium may be brought to the test site in suitable vessels, or it may in situations where the PSV Safety Controller (110) is permanently mounted to the PSV 100, also be permanently connected to a permanently mounted source for the Calibration Medium.

Step 6—The Safety Controller also contains two Pressure Measurement Devices integrated with the controller connected to the outlets 115, 116. The Safety Controller (SC) may also contain a flow or mass and a volume measuring device to measure how much volume or mass is being used for test or calibration of a given PSV valve or to quantify the size of an identified valve leakage.

Step 7—Once all mechanical connections and safety isolations are established, and the configured connection to operators and/or safety system are electronically established, and PSV safety controller has received a signal identifying the correct testing objects and no Abnormal Conditions relative to the planned testing process from all the Isolation Valves and connected Bleed Valves, as well as not receiving any pressure measurement that any of the valves has an unacceptable leak and pressure—build-up, the testing process may start.

Testing the PSVs and the Isolation Valves in one PSV System is done as according to the following steps 1 to 6.

Step 1—Once all connections are established according to previous steps, the pressure in connection 115 and 116 are lifted to a level which may be 90% of the Isolation Valve's 106 set maximum. This since the Isolation Valves of the outlet pressure in most cases have a lower maximum pressure rating than the PSV. If the set-pressure of the PSV 100 is lower than the maximum pressure of the Isolation Valve 101, that is 90% of the set pressure will then be applied to both sides of the PSV 100 through connection 115 and 116 and once the pressure is established, the supply of testing medium gets closed. The pressure on both 115 and 116 from the valves and pipes will be monitored for a pre-chosen time dependent of size of valves and pipes, and long enough to establish that the P2 side of Isolation valve 106 does not leak. This can be established by the Safety Controller while monitoring the respective pressure in 115 and 116 as well as listening to leakage sound from the isolation Valves 102, 106. Leakage through the two isolation valves or their associated piping will be detected fast by the ACD unit. Any leakage on isolation valve 106 outside the acceptable limit needs to be repaired before further testing continues. Assuming no leaks are observed, the system is then safe for in-line testing.

Step 2—Having controlled that the isolation valve 106 does not leak, the Safety Controller bleed to air or water the test volume between the Isolation Valve 106, the PSV 100 and in the connecting pipelines while measuring the bleed volume compensated for the declining pressure by the Safety Controller (SC) has specified for. The total value of this Volume Q2 can be calculated by measuring the pressure drop from a maximum and to a lover pressure like 10 bar lower. By using calculations, the Safety Controller will then identify the complete 02 volume at a given reference pressure and then store this in the Safety Controller. The Safety Controller parallel to the ventilation of the Q2 volume bleed out the P1 side between the Isolation Valve 102 and the PSV 100 as well as associated piping 116 to air or water. Then the bleed switches inside the Safety Controller gets closed. The Safety Controller listen for any leak signal from the ACD unit. Once the Safety Controller is satisfied that the Isolation valve 102 is tight or the leaks within acceptable limits, the testing of the PSV 100 can commence. If not, the complete testing will have to wait until the Isolation valve 102 have been repaired. Given the Inlet Valve 102 leak more than accepted for a complete testing, the Safety controller 110 will still try to inject enough calibration pressure through pipe 116 to identify that it opens at—or close to the set-pressure to ensure it can work as a "functional safety" in case the other system in a solution needs to be taken closed off for testing. The opening is detected by the ACD 101 and the pressure is derived from the supply pressure from pipe 116.

Step 3—Checking that the PSV 100 opens at acceptable level; With pipe 115 from the outlet side vented to air through—or in rare incidents vented to a given backpressure, the Safety Controller automatically or manually ramp the test pressure of the PSV 100 from the Calibration inlet 113 to the Bleed valve 104 as fast as previously defined in the electronic test program for the given valve, and to the pre-set adjustable starting test pressure which as an example may be 90% of the pre-calibrated and expected opening pressure of the PSV 100 i.e. the pressure from where it within acceptable accuracy is expected to open. If the PSV has a major leakage, the ACD unit 101 will send a leakage alarm to the Safety Controller 110 If a leakage signal is received, it is likely to be substantial enough—according to a given Company Standard, to be taken out for repair.

Step 4—Given that a big leak is not detected; Ramping up the pressure rather slow to the level where the seat starts opening and let pressure out to the P2 side (Q2) of the PSV 100. This leak will be detected by the small lift caused by the slow ramp up of pressure which avoid force to be established on the enlarged seat on the P2. This identification of actual opening pressure will then be detected of the ACD 101. Once the lift occur the Safety Controller stop providing more calibration medium through pipe 116 and start monitoring the pressure in this pipe. The Q2 side is then vented to air or water. The P2 pressure is then lowered to a Company and valve specific level like 95% or 90% of opening pressure, then lifted to opening detection again and lowered to the level of 95% (or other) This is repeated as many times as the Company specific standard decide for a given type of valve. The Opening Pressure and whether that is acceptable is now established. Given the opening pressure is within accepted level, the testing can continue to next level, or the valve is taken out for repair or adjusted in line dependent of what the Company standards allow.

Step 5—Detection of a tight valve; As the pressure in the P1 side through the above test steps increases and no leak is detected by the ACD Unit 101, the P1 pressure may by the safety controller be elevated to a pre-set safe test level above the set pressure like 110% of set pressure. In the case that no leak is still not detected by the acd unit 101, the P1 and the P2 side of the PSV 100 will be ventilated to air and the valve will be taken out for repair.

Step 6—In line testing by sound whether the PSV 100 is tight closed enough to be verified for further use without being taken out of pipe line; The verification for re-certification of a PSV to continue without being taken out for repair is that it opens on set-pressure+—acceptable deviation and meets the low-leak standards after it has been tested. Acceptable leak may be in some cases be as low as 0,017 Standard Cubic Meters at atmospheric pressure—or below which is the acceptable leak rate of one popular standard the API-527. Based on the size of the valve in questions, this small leak may be difficult to measure precisely with sound-based leak-listening devices. For enhances sound detection, the ACD may be equipped with one—or more super-sensitive sensors (microphones) which are connected to the ACD by a short lead and gets physically connected to the valve by being screwed or glued on the valve body. These will then sense the low flow and send messages to the Safety Controller which decides whether the leak is within acceptable range or the valve needs to be taken out for repair.

Step 7—In line testing for acceptable small leaks by identifying said small leaks by measuring pressure build-up in the known volume Q2; whether the PSV 100 in the line for to verify that they can be verified for further use without being taken out of line. This method differs from prior art that it used the potential pressure build up to a volume Q2 as described in #12 above. By doing that instead of measuring flow the invention can measure almost any low leakage. The volume between a closed and tight Isolation valve Q105, the PSV 100 and the associated piping 115 and 116 to the safety controller 110 is known and stored as Q2 based on the #12 calculation. This known Q2 volume and the curve for measured pressure increase over time is then used to calculate the acceptable mass flow. A relevant component to this calculation is hence the input test pressure for the calibration medium which is applied automatically to the P1 side of PSV 1 through the bleed valve 104 and pipe 116 while the Isolation Valve is in closed position. The P1 test pressure of the PSV 100, provided by line 116 will then be part of the actual mass-flow calculation executed by an algorithm in the Safety Controller for leak verification, the test pressure P1 will be ramped up to a level provided by the standard or procedure a Company uses. Typical may be 95% to 90% of set-pressure or 95% of acceptable opening pressure. This pressure is then by the Safety Controller kept steady for an adjustable pre-defined time. The chosen time will typically be longer the smaller the acceptable leak is. This method differs from current art that it may needs no external bubbling system like FIG. 8 or very costly and complex mass flow meters to do an extremely precise measurement of any low leakage.

Ensuring the Total Safety of a Dual or Triplicated PSV system, called a PSV solution is done like following:

The layout is shown in FIG. 2 where the operation of the valves can be done manually or by actuators as shown in the drawing. To be safe, the Isolation Valves to at least one PSV system must be open, and the PSV verified to open at defined set-pressure. In most dual or triplicated PSV solutions, the 2 (or 3) P1 Isolation Valves 102, 202 are in prior art connected in what is called a Car-seal-solution which has many variations, typically where an Isolation Valve 102, 202 may be connected by a chain where closing one valve forces the other one to open. This in order to ensure that one PSV system is always intact. The same goes for the outlet valves, various mechanical solutions seek to ensure that one PSV system is always open.

The more complex solution in prior art, but frequently used because of the high safety against incorrect sequence of openings, are Mechanical- or Electro-mechanical Key-lock systems. The key-lock systems are normally constructed by a mechanical locking device attached to the top of each manually operated Isolation Valve where the sequence to open the first valve in a sequence to change from one PSV system to another, start with insertion of a mechanically coded key into the first Lock on the first valve in a sequence.

The technician is now able to operate the manual gear box and open the valve. Once the opening is complete, the lock on top of the valve will release the second key which is used to operate the next valve, while "looking in" the first key. The second key will release the 3rd key and keep the second key and so on. To reverse the operation later, the keys are operated in the reverse order. A safe but complex sequence involving multiple valves in right sequence is started. For the reverse operation to change back to the first system, the valves and the keys are used in the reverse order. This prior art is complex to establish, costly to maintain and to modify.

An electronic feedback Safety Valve Solution with local and central alarms against incorrect sequence which differs from prior art as described in previous step. The FIG. 10, showing 2 systems, PSV 100, 200 forms a solution. To be safe for operation and testing, the valve opening sequence once preparing a test of one of the PSVs like PSV 200 which is the operating system, the first step is to ensure that Isolation valve 106 is opened. This one normally has a lower pressure rating than the pressure which may come through a PSV after the P1 Isolation valve is opened and PSV 100 opens. Next preparation is hence to open Isolation valve 102. The Bleed valves are closed: Both systems are now operational. The system PSV 200 is then sealed off for testing. First by closing the Isolation valve on the high-pressure side 202. Then slowly opening bleed valve 204 to bleed out overpressure between the valve 204 and the PSV 200. Then the outlet isolation valve 206 gets closed and bleed valve 208 gets opened to bleed out any overpressure in the P2 side cavity of the PSV 200 and the isolation valve 206. The signals of the valve positions to the Safety Controller 110 come from the ACD units of the different valves which gets compared with the defined sequence which can be defined in the said Safety Controller. Once the valves are in the right position, the pressure connections from the Safety Controller and bleed valves 204 and 108 can be established. The Isolation valves can be operated manually and the safety controller, as well as a direct connection from the ACD units' sequence. The safety controller receives the close signals, valve by valve from the electronic safety system and compare this with the same signals received direct. If any signals deviate, or there is the slightest initial effort is done to operate any wrong valve out of sequence—a warning sound as well as a visual alarm will take place.

Actuator driven Safety valve sequence which additionally allow remote- and automatic testing. The Actuators (ACT) are shown on FIG. 9 and are in most cased electrically operated. The actuator power may be other mediums like pneumatic, hydraulic, the actuator drive medium is not important for understanding of the operation. The ACT may also be a Manual/Electrical device where the electrical signal to open or closed is needed in order to operate the valve in a given way, while the operating power comes from a manual operation of the mechanical gear box that normally provides enough power to operate a manually operated valve by a handle or a wheel. The current invention using actuators which manually triggered on the Safety Controller 110 or on a mobile unit and tells which valve to operate in the different sequences. The opening cannot take place however, less an electronic acceptance signal from a remote safety system and/or from the Safety Controller is received. The combination of signals to allow operation is determined by the safety level required by the Company that uses the solution. This Actuator operated operation of Isolation Valves as well as actuator operated Bleed Valves, will then a safety controller or similar function with available test medium is permanently mounted, allow remote testing once the testing signals are given. This allows full PSV testing in unmanned or partly manned processes like an unmanned Oil and Gas Platform.

The invention claimed is:

1. A pressure safety valve system for in-line testing and calibration of pressure safety valves (PSV), the system including a first pressure safety valve (PSV) with an inlet, outlet and valve seat working against an adjustable spring which is controlling when said first PSV opens, a first isolation valve at the inlet of the first PSV, a second isolation valve at the outlet of the first PSV, a first bleed valve at the inlet of the first PSV between the first isolation valve and said first PSV, a second bleed valve at the outlet of the first PSV between said first PSV and the second isolation valve, the pressure safety valve system further comprising:
   a first Safety Controller (SC) with a processor or controller, data storage unit, and communication means for sending and receiving signals from/to the first SC and an external safety system, the first SC further including a calibration medium input connected to a source of a calibration fluid and a ventilation port,
   a first fluid line connecting the first SC to the first bleed valve,
   a second fluid line connecting the first SC to the second bleed valve,
   wherein the first SC is adapted to connect any of the first and second fluid lines to any of the calibration medium input and the ventilation port or close off any of the fluid lines,
   the first SC further including means for regulating and measuring pressure and fluid flow in each fluid line
   a first Abnormal Condition Detector (ACD) unit connected to the first PSV for detecting leak sounds,
   second and third ACD units connected to each isolation valve, for detecting sound and valve position,
   fourth and fifth ACD units connected to each bleed valve, for detecting sound, valve position and flow, and
   wherein the ACD units are connected to the first SC for transferring leak and position data to the first SC.

2. A system according to claim 1, further including a second pressure safety valve PSV with isolation valves and bleed valves at the inlet and outlet of the second PSV, a second Safety Controller SC with a calibration medium input and a ventilation port, fluid lines connecting the second SC to the bleed valves, means for regulating and measuring pressure and fluid flow in each fluid line, ACD units for detecting leak sound, valve positions and flow, the ACD units being connected to the second SC for transferring leak and position data to the second SC, wherein the first and second PSVs are connected in parallel, the system further including means, such as a Car-seal-solution, a Key-lock system or an electronic Safety Valve Solution, to ensure that the PSV system is always intact and one PSV is always open and to provide a correct valve opening sequence.

3. A system according to claim 1, wherein the first and second isolation valves and the respective first and second bleed valves are equipped with actuators and are connected to the SCs enabling the SCs to open or close the valves automatically.

4. A method for use in a system for in-line testing and calibration of pressure safety valves (PSV), the system including: a first pressure safety valve (PSV) with an inlet, outlet and valve seat working against an adjustable spring which is controlling when said first PSV opens; a first isolation valve at the inlet of the first PSV; a second isolation valve at the outlet of the first PSV; a first bleed valve at the inlet of the first PSV between the first isolation valve and said first PSV; a second bleed valve at the outlet of the first PSV between said first PSV and the second isolation valve; a first Safety Controller (SC) with a processor or controller, data storage unit, and communication means for sending and receiving signals from/to the first SC and an external safety system, the first SC further including a calibration medium input connected to a source of a calibration fluid and a ventilation port; a first fluid line connecting the first SC to the first bleed valve; a second fluid line connecting the first SC to the second bleed valve, wherein the first SC is adapted to connect any of the first and second fluid lines to any of the calibration medium input and the ventilation port or close off any of the fluid lines; the first SC further including means for regulating and measuring pressure and fluid flow in each fluid line; a first Abnormal Condition Detector (ACD) unit connected to the first PSV for detecting leak sounds; second and third ACD units connected to each isolation valve, for detecting sound and valve position; fourth and fifth ACD units connected to each bleed valve, for detecting sound, valve position and flow, wherein the ACD units are connected to the first SC for transferring leak and position data to the first SC, the method comprising:
   verifying the positions of the first and second isolation valves, and the first and second bleed valves,
   testing tightness of the first and second isolation valves, by supplying calibration fluid from the SC through the first and second bleed valves, and either detecting possible leak sound from said isolation valves by the second and third ACD units, or measuring the amount of calibration medium needed to keep the pressure between the isolation valve and the PSV stable and comparing this volume with a previous volume measurement,
   determining the opening/lifting pressure of the PSV by closing the isolation valves and opening the bleed valves to let out any overpressure from the inlet or outlet of the PSV, the SC then supplying calibration fluid to the inlet of the PSV through the first bleed valve ramping up the pressure until the PSV starts opening, this opening being detected by the first ACD unit,
   in case no opening of the PSV is detected, determining if the PSV is stuck or clogged by elevating the pressure to a pre-set safe test level above the set pressure of the PSV and detecting any leaks to determine if the PSV needs to be replaced or repaired,
   determining if the PSV is tight enough to remain in service by applying calibration fluid to the input side of the PSV at a standard pressure level and the first ACD unit either listening for leak sounds or measuring pressure build up at the output side of the PSV, recording and storing test parameters relating to the condition of the PSV and the isolation valves.

5. The method according to claim 4, wherein the step of determining the opening/lifting pressure of the PSV is repeated by lowering and ramping the pressure a predetermined number of times in order to ensure reliable readings.

6. The method according to claim 4, wherein the step of determining the opening/lifting pressure of the PSV includes ramping up the pressure in the calibration fluid stepwise at a rate sufficiently slow to avoid activating any increased lift area function in the PSV and allow testing to continue without having to manually decouple this function.

7. The method according to claim 4 wherein the step of determining if the PSV is tight enough to remain in service includes:

closing the first and second isolation valves, opening the first and second bleed valves, applying the same pressure on both sides of the PSV, venting the pressure between the PSV and the second isolation valve through the SC, calculating the volume between PSV and the second isolation valve and second fluid line by measuring the fluid flow through the second fluid line until a given lower pressure is reached, applying test fluid to a predefined leak testing level of the PSV through the first bleed valve, measuring any pressure build-up in the volume between PSV and the second isolation valve and second fluid line over a given time period, using the pressure build-up in the volume between PSV and the second isolation valve and second fluid line over said given time period to calculate the leak rate per time unit.

8. The method according claim 4, wherein the first and second SCs are connected and will monitor a safe sequence of opening and closing of the isolation valves as well as the bleed valves when changing from one PSV to the PSV being tested, wherein any effort to open any incorrect valve out of sequence will trigger alarms.

9. The method according to claim 8, including the steps of first opening the second isolation valve before opening the first isolation valve of the second PSV, the first and second SCs sending signals concerning the position of all isolation and bleed valves to a central safety system which via a valve safety matrix program decide whether it is safe to proceed, wherein a continue signal from the central safety system is needed in order to proceed, if a field operator tries to proceed without the continue signal a local alarm as well as an alarm from the central safety system is activated, if a continue signal is received, the first isolation valve of the first PSV is closed and its tightness tested, if the integrity of the first isolation valve is verified, the second isolation valve of the first PSV is closed and its tightness tested, if the integrity of the second isolation valve is verified, the first PSV is tested for correct opening pressure, if it is stuck or clogged, and/or is tight enough to remain in service, once the testing has been completed, first opening the second isolation valve, then the first isolation valve in order to activate the first PSV, or hold the isolation valves closed in order to replace or repair the first PSV.

10. The method according to claim 9, wherein the isolation and bleed valves are operated manually by a field operator, the field operator receiving signals from the first SC for each step to be executed.

11. The method according to claim 9, wherein the PSVs are equipped with permanently mounted PCs which is wired or wirelessly connected to said ACD units as well as to hydraulic, pneumatic or electric actuators operating said isolation and bleed valves, for automatically operating said valves, wherein each SC is adapted to operate the actuators when receiving the continue signal from the central safety system, and said ACD units are adapted to monitor that the isolation and bleed valves open or close according to the given signal.

12. The method according to claim 10, wherein an electrical or mechanical locking device prevents the opening of any of said valves unless opened or allowed to be opened by the SCs or the central safety system.

* * * * *